United States Patent
Song et al.

(10) Patent No.: US 8,709,962 B2
(45) Date of Patent: Apr. 29, 2014

(54) ANTI-REDUCTIVE HIGH-FREQUENCY CERAMIC DIELECTRIC MATERIAL SINTERED AT LOW TEMPERATURE AND MATCHED WITH COPPER INTERNAL ELECTRODE

(75) Inventors: Beibei Song, Zhaoqing (CN); Yongsheng Song, Zhaoqing (CN); Fangce Mo, Zhaoqing (CN); Juan Li, Zhaoqing (CN); Xiaoguo Wang, Zhaoqing (CN); Jinghua Guo, Zhaoqing (CN)

(73) Assignee: Guangdong Fenghua Advanced Technology Holding Co., Ltd., Zhaoqing, Guangdong Province (CN)

( * ) Notice: Subject to any disclaimer, the term of this patent is extended or adjusted under 35 U.S.C. 154(b) by 0 days.

(21) Appl. No.: 13/377,499

(22) PCT Filed: Dec. 20, 2010

(86) PCT No.: PCT/CN2010/079974
§ 371 (c)(1),
(2), (4) Date: Dec. 9, 2011

(87) PCT Pub. No.: WO2011/076090
PCT Pub. Date: Jun. 30, 2011

(65) Prior Publication Data
US 2012/0250222 A1    Oct. 4, 2012

(30) Foreign Application Priority Data
Dec. 22, 2009 (CN) .......................... 2009 1 0214109

(51) Int. Cl.
*C04B 35/00* (2006.01)
*B32B 9/00* (2006.01)
*B32B 19/00* (2006.01)

(52) U.S. Cl.
USPC ........................... 501/135; 428/699; 428/702

(58) Field of Classification Search
USPC ........... 501/134, 135; 428/688, 689, 699, 702
See application file for complete search history.

(56) References Cited

U.S. PATENT DOCUMENTS

| | | | |
|---|---|---|---|
| 6,117,806 A * | 9/2000 | Yokoi et al. | 501/135 |
| 6,514,895 B1 * | 2/2003 | Chiu et al. | 501/137 |
| 6,602,623 B1 | 8/2003 | Mizutani et al. | |
| 6,853,536 B2 * | 2/2005 | Nakamura et al. | 361/321.4 |
| 7,518,199 B2 * | 4/2009 | Shimizu et al. | 257/411 |
| 2011/0236634 A1 * | 9/2011 | Kawano et al. | 428/141 |

FOREIGN PATENT DOCUMENTS

| | | |
|---|---|---|
| CN | 1635593 A | 7/2005 |
| CN | 1673143 A | 9/2005 |
| CN | 1673174 A | 9/2005 |
| CN | 1801417 A | 7/2006 |
| CN | 101323521 A | 12/2008 |
| CN | 101786866 A | 7/2010 |
| JP | 1141838 A | 6/1989 |

OTHER PUBLICATIONS

Taura et al. Trace element partitioning between silicate perovskites and ultracalcic melt. Physics of the Earth and Planetary Interiors 124 (2001) 25-32.*
International Search Report Dated Mar. 24, 2011 from PCT/CN2010/079974.

* cited by examiner

*Primary Examiner* — Noah Wiese
(74) *Attorney, Agent, or Firm* — Ohlandt, Greeley, Ruggiero & Perle, L.L.P.

(57) ABSTRACT

Provided is an anti-reductive high-frequency ceramic dielectric material sintered at low temperature and matched with copper internal electrode, which can be used for producing multi-layer ceramic capacitor with a copper internal electrode. The ceramic dielectric material consists of main crystalline phase, modifying additive and sintering flux. The formula of the main crystalline phase is $Mg_xBa_{(1-x)}Zr_ySi_{(1-y)}O_3$, wherein $0.8 \le x \le 0.95$, $0.05 \le y \le 0.2$. The modifying additive is one or more of $MnO_2$, $CaO$, $Li_2O$, $Bi_2O_3$ and $TiO_2$, and the sintering flux is one or more of $B_2O_3$, $SiO_2$, $ZnO$, $CuO$, $K_2O$ and $BaO$. The ceramic dielectric material meets the requirements of COG characteristics by EIA standard, has such characteristics as uniform particle size distribution, high dispersiveness, optimized molding process, eco-friendliness and excellent dielectric properties.

10 Claims, No Drawings

ANTI-REDUCTIVE HIGH-FREQUENCY CERAMIC DIELECTRIC MATERIAL SINTERED AT LOW TEMPERATURE AND MATCHED WITH COPPER INTERNAL ELECTRODE

FIELD OF TECHNOLOGY

The present invention relates to a ceramic dielectric material and the multilayer ceramic capacitors using same. More particularly, an anti-reductive high-frequency ceramic dielectric material that can be sintered at low temperature, meets the requirements of COG characteristics and can be matched with copper internal electrode.

BACKGROUND

Driven by the growing demand for high performance and low cost products, ceramic capacitor manufacturers have been continuously searching for alternative materials that can both reduce the production cost and provide higher performance. It has become one of the major challenges to these manufacturers. Presently, base metals have been widely used in the production of multilayer ceramic capacitors (MLCC hereinafter). More than 80% of MLCCs use base metals as internal electrodes (mostly nickel) in replacement of palladium-silver, cutting production cost by about 40%. Further study shows that the usage of copper electrodes has been put on the agenda. Compared to other base metals, copper is less expensive and has better electrical properties in high-frequency applications. However, copper is also easier to oxidize and has a lower melting point (1083° C.) than nickel (whose melting point is 1453° C.). The sintering temperatures of ceramic dielectric material commonly used today are too high for copper electrodes thereby results in poor electrical properties of MLCC. Thus, in order to use copper as internal electrodes, it's required to develop a ceramic dielectric material that can fulfill the associated technical requirements.

SUMMARY

The technical challenge faced by the present invention is to provide an anti-reductive ceramic dielectric material for high-frequency MCLL with copper internal electrode. The ceramic dielectric material conforms to RoSH Directive, meets the requirements of chip on glass (COG) dielectric characteristics, and has such characteristics as high dispersiveness and optimized molding process.

To solve the above-mentioned problem, the present invention provides an anti-reductive high-frequency ceramic dielectric material which can be sintered at low temperature and can be matched with copper internal electrode. It comprises main crystalline phase, modifying additive and sintering flux. The formula of the main crystalline phase is $Mg_x Ba_{(1-x)} Zr_y Si_{(1-y)} O_3$, wherein $0.8 \leq x \leq 0.95$ and $0.05 \leq y \leq 0.2$. The modifying additive is one or more of $MnO_2$, $CaO$, $Li_2O$, $Bi_2O_3$ and $TiO_2$; and the sintering flux is one or more of $B_2O_3$, $SiO_2$, $ZnO$, $CuO$, $K_2O$ and $BaO$. Furthermore, said anti-reductive high-frequency ceramic dielectric material sintered at low temperature and matched with copper internal electrode comprises the main crystalline phase being in a range of 80-95 mol %, the modifying additive being in a range of 1.2-10 mol % and the sintering flux being in a range of 2.5-18 mol %. Components of the modifying additive in said invention comprise $MnO_2$ 0.2-0.5 mol %, $CaO$ 0-1.0 mol %, $Li_2O$ 1.0-3.0 mol %, $Bi_2O_3$ 0-5.0 mol % and $TiO_2$ 0-1.0 mol %. Components of the sintering flux in said invention comprise $B_2O_3$ 1.0-3.0 mol %, $SiO_2$ 0-6.0 mol %, $ZnO$ 1.5-6.0 mol %, $CuO$ 0-1.0 mol %, $K_2O$ 0-1.0 mol % and $BaO$ 0-1.0 mol %. Said main crystalline phase is obtained by ball milling and evenly mixing $Mg(OH)_2$, $SiO_2$, $BaCO_3$ and $ZrO_2$, and then precalcining the mixture of $Mg(OH)_2$, $SiO_2$, $BaCO_3$ and $ZrO_2$ at 1050° C.-1170° C.

In the above-mentioned composition, a $Mg_x Ba_{(1-x)} Zr_y Si_{(1-y)} O_3$-based compound with excellent high-frequency performance is chosen as the main crystalline phase. The compound has a low dielectric constant, a low dielectric dissipation factor and nearly-linear dielectric-temperature characteristics which later ensure excellent electrical properties of MLCC using same. The modifying additive can maintain the dielectric constant of the material at about 10 and adjust the temperature coefficient of the ceramic dielectric material to achieve nearly-linear dielectric-temperature characteristics. The modifying additive can also inhibit the abnormal grain growth of the ceramic, promote uniform grain growth, therefore significantly increase the dielectric compressive strength of the ceramic material and improve MLCC reliability. One of the main functions of the sintering flux is to decrease the sintering temperature of the ceramic material, so that it can be sintered at temperatures below 1100° C. The sintered ceramic material has uniform grain growth and high density which further ensure the high reliability of MLCC using same. The present invention provides a non-ferroelectric, $Mg_x Ba_{(1-x)} Zr_y Si_{(1-y)} O_3$-base ceramic dielectric material matched with copper internal electrode. The dielectric material is sintered in a reducing atmosphere below 1100° C., can be matched with copper internal electrode and has great dielectric properties.

The fabrication of MLCC with said ceramic dielectric material comprises of the preparation of ceramic slurry, the fabrication of dielectric sheets, alternately screen printing and stacking of internal electrodes and dielectric sheets, briquette drying, lamination, dicing, binder-removing, sintering, chamfering, termination dipping and termination firing. More specifically, in accordance with the manufacturing process of chip MLCC, organic binders and solvents such as ethanol are added to ceramic powder to produce ceramic slurry. The slurry is casted to form ceramic green sheets. Copper internal electrodes are then printed on the sheets, followed by alternately stacking the sheets until the required number of layers is reached to form a MLCC laminated body. Next, the laminated sheets are diced into laminated chips and subsequently fired at a temperature between 200-300° C. in order to remove the organic binders and solvents. The MLCC chips are subsequently sintered in a reducing atmosphere at a temperature between 1000-1100° C. for 2.5-5 hours. After surface-polishing treatment, each terminal of the capacitor is mounted with external copper electrodes to connect with the internal electrodes. The external electrodes are further fired at a temperature between 830-900° C., followed by electroplating and other procedures to obtain MLCCs. This method uses low sintering temperature and requires simple processing equipments. The ceramic dielectric material has uniform particle size distribution. The sintered ceramic material has uniform and dense grain growth. The MLCC made from the ceramic dielectric material has excellent electrical performance.

DETAILED DESCRIPTION

The main idea of the present invention is to use a $Mg_x Ba_{(1-x)} Zr_y Si_{(1-y)} O_3$-base system as the main crystalline phase of the material, add modifying additive to improve dielectric properties, and add sintering flux to lower the sintering temperature. In accordance with common manufacturing procedures, ceramic powder is prepared and further used in manufacturing a low-temperature sintered ceramic dielectric material that meets the requirements of COG characteristics, and has characteristics such as high dispersiveness and optimized molding process. Additionally, the MLCCs made from said ceramic material have minimal or no defects due to the low sintering temperature as well as uniform and dense grain growth. The following embodiments are set forth as detailed descriptions of the present invention, but in no way to limit the scope of the technical solution of the present invention. The formula of the dielectric material can be chosen as per specific conditions and has no substantial effects on the result. The basic scheme of the dielectric material formula proposed in the present invention is an anti-reductive high-frequency ceramic dielectric material sintered at low temperature and matched with copper internal electrode, comprising main crystalline phase, modifying additive and sintering flux. The formula of the main crystalline phase is $Mg_xBa_{(1-x)}Zr_ySi_{(1-y)}O_3$, wherein $0.8 \leq x \leq 0.95$ and $0.05 \leq y \leq 0.2$. The modifying additive is one or more of $MnO_2$, $CaO$, $Li_2O$, $Bi_2O_3$ and $TiO_2$. And the sintering flux is one or more of $B_2O_3$, $SiO_2$, $ZnO$, $CuO$, $K_2O$ and $BaO$.

The First Embodiment

An anti-reductive high-frequency ceramic dielectric material sintered at low temperature and matched with copper internal electrode is fabricated as below: ball-milling and evenly mixing raw materials (>99.5% purity), 0.8 mol $Mg(OH)_2$, 0.8 mol $SiO_e$, 0.2 mol $BaCO_e$ and 0.2 mol $ZrO_e$, and calcining the mixture at 1150° C. for 3 h hours to obtain a ceramic dielectric material containing main crystalline phase, $Mg_eBa_eSi_eZr_eO_e$; then adding modifying additive and sintering flux according to the preset ratios as given in Table 1.

TABLE 1

Formula of main crystalline phase, modifying additive and sintering flux

| No. | Main crystalline phase $Mg_{0.8}Ba_{0.2}Si_{0.8}Zr_{0.2}O_3$ (mol %) | Modifying additive (mol %) | | | | | Sintering flux (mol %) | | | | | |
|---|---|---|---|---|---|---|---|---|---|---|---|---|
| | | $Li_2O$ | $TiO_2$ | MnO | CaO | $Bi_2O_3$ | $B_2O_3$ | ZnO | $SiO_2$ | CuO | $K_2O$ | BaO |
| 1 | 80 | 3.0 | 1.0 | 0.5 | 0 | 0 | 2.0 | 6.0 | 6.0 | 0 | 0.5 | 1.0 |
| 2 | 82 | 2.5 | 0.8 | 0.4 | 1.0 | 1.0 | 3.0 | 5.0 | 2.3 | 1.0 | 0 | 1.0 |
| 3 | 84 | 2.2 | 0.6 | 0.4 | 0.8 | 3.0 | 2.1 | 4.5 | 2.4 | 0 | 0 | 0 |
| 4 | 86 | 2.0 | 0 | 0.3 | 0 | 5.0 | 2.2 | 4.5 | 0 | 0 | 0 | 0 |
| 5 | 88 | 2.0 | 0 | 0.3 | 0.4 | 0 | 1.8 | 4.0 | 2.5 | 0 | 1.0 | 0 |
| 6 | 90 | 2.0 | 0 | 0.2 | 0 | 0 | 1.6 | 3.3 | 2.5 | 0.4 | 0 | 0 |
| 7 | 92 | 2.0 | 0 | 0.2 | 0 | 0 | 2.0 | 3.0 | 0 | 0.8 | 0 | 0 |
| 8 | 92 | 2.0 | 0 | 0.2 | 0 | 0 | 2.0 | 3.8 | 0 | 0 | 0 | 0 |
| 9 | 94 | 1.5 | 0 | 0.2 | 0 | 0 | 1.5 | 2.5 | 0.3 | 0 | 0 | 0 |
| 10 | 95 | 1.0 | 0 | 0.2 | 0 | 0 | 1.0 | 1.5 | 0.6 | 0 | 0 | 0.7 |

The ceramic dielectric material is fabricated in accordance with common manufacture process used by the skilled in the art. According to the manufacturing process of chip MLCC, organic binders and solvents such as ethanol are mixed with ceramic powder to make ceramic slurry. The ceramic slurry is then casted to form ceramic green sheets. Next, the copper internal electrodes are printed on the green sheets, and then alternately stacking the sheets until the required number of layers is reached in order to form a laminated body. The laminated body is diced into ceramic chips and subsequently fired at a temperature between 200-300° C. in order to remove the organic binders and solvents. Next, the MLCC chips are then sintered in a reducing atmosphere at a temperature between 1000-1100° C. for 2.5-5 hours. After surface-polishing treatment, each terminal of the capacitor is mounted with external copper electrodes to connect with the internal electrodes. Then the external electrodes are fired at a temperature between 830-900° C., followed by electroplating and other procedures to obtain MLCCs. This method uses low sintering temperature and requires simple processing equipments. The ceramic dielectric material has uniform particle size distribution. The sintered ceramic material has uniform and dense grain growth. The MLCC made from this ceramic material has stable capacitance and good electrical properties. The capacitance and dielectric loss of the MLCC are measured with an electrical bridge (HP4278) at 1 MHz, 1.0V (AC) at room temperature (25° C.). The insulation resistance is measured with a fast insulation resistance meter (SF2512) by applying 100V rated DC voltage for 10 seconds. The dielectric constant-temperature coefficient is measured with a high and low temperature testing chamber at temperatures between −55° C. to +125° C. Impedance/grain-phase analyzer HP4991A is used to examine the frequency characteristics of the MLCC. The measured parameters of the product are shown corresponding to the material formulas 1-10 listed in Table 2.

TABLE 2

Electrical Properties of MLCC made from the aforementioned ceramic dielectric material

| No. | Dielectric constant | Dielectric loss DF ($\times 10^{-4}$) | Temperature coefficient −55−+125° C. (ppm/° C.) | Insulation resistance ($\Omega$) |
|---|---|---|---|---|
| 1 | 10.1 | 0.9 | −10 - 20 | $>10^{11}$ |
| 2 | 9.8 | 0.7 | 5 - 15 | $>10^{11}$ |
| 3 | 9.5 | 0.9 | 13 - 20 | $>10^{11}$ |
| 4 | 8.9 | 0.9 | −6 - 17 | $>10^{11}$ |
| 5 | 9.7 | 1.2 | 5 - 13 | $>10^{11}$ |
| 6 | 9.1 | 1.1 | 6 - 9 | $>10^{11}$ |
| 7 | 10.2 | 0.7 | −2 - 6 | $>10^{11}$ |
| 8 | 11.3 | 0.9 | 8 - 11 | $>10^{11}$ |
| 9 | 10.3 | 1.5 | −5 - 7 | $>10^{11}$ |
| 10 | 9.8 | 1.0 | −8 - 2 | $>10^{11}$ |

The Second Embodiment

An anti-reductive high-frequency ceramic dielectric material sintered at low temperature and matched with copper internal electrode is fabricated as below: ball-milling and evenly mixing raw materials (>99.5% purity), 0.9 mol $Mg(OH)_e$, 0.9 mol $SiO_e$, 0.1 mol $BaCO_e$ and 0.1 mol $ZrO_2$, and calcining the mixture at 1150° C. for 3 hours to obtain a ceramic dielectric material containing main crystalline phase, $Mg_{0.9}Ba_{0.1}Si_{0.9}Zr_{0.1}O_3$; then adding modifying additive and sintering flux according to the preset ratios as given in Table 3.

TABLE 3

Formula of main crystalline phase, modifying additives and sintering flux

| No. | Main crystalline phase $Mg_{0.8}Ba_{0.2}Si_{0.8}Zr_{0.2}O_3$ (mol %) | Modifying additive (mol %) | | | | | Sintering flux (mol %) | | | | | |
|---|---|---|---|---|---|---|---|---|---|---|---|---|
| | | $Li_2O$ | $TiO_2$ | MnO | CaO | $Bi_2O_3$ | $B_2O_3$ | ZnO | $SiO_2$ | CuO | $K_2O$ | BaO |
| 11 | 80 | 3.0 | 0 | 0.5 | 0 | 5.0 | 2.0 | 6.0 | 1.0 | 1.0 | 0.5 | 1.0 |
| 12 | 81 | 2.5 | 1.0 | 0.4 | 0.5 | 4.0 | 3.0 | 60 | 1.8 | 0 | 0 | 0.0 |
| 13 | 83 | 2.2 | 0.8 | 0.4 | 1.0 | 3.0 | 2.1 | 4.5 | 1.6 | 0.4 | 1.0 | 0 |
| 14 | 86 | 2.0 | 0.6 | 0.3 | 0.7 | 2.0 | 2.2 | 4.2 | 2.0 | 0 | 0 | 0 |
| 15 | 88 | 2.0 | 0.4 | 0.3 | 0.4 | 1.0 | 1.8 | 3.5 | 2.3 | 0 | 0 | 0.3 |
| 16 | 90 | 2.0 | 0.2 | 0.2 | 0.2 | 0 | 1.6 | 3.3 | 2.5 | 0 | 0 | 0 |
| 17 | 90 | 2.0 | 0 | 0.2 | 0 | 0.5 | 2.0 | 3.0 | 1.0 | 0.8 | 0 | 0.5 |
| 18 | 91 | 1.8 | 0 | 0.2 | 0 | 0 | 2.0 | 3.8 | 0 | 1.0 | 0 | 0.2 |
| 19 | 93 | 1.5 | 0 | 0.2 | 0 | 0 | 1.5 | 2.5 | 0.7 | 0 | 0.6 | 0 |
| 20 | 95 | 1.0 | 0 | 0.2 | 0.3 | 0 | 1.0 | 2.0 | 0 | 0.2 | 0.3 | |

Table 4 shows the results of the electrical property tests of MLCC manufactured with the method of the first embodiment.

TABLE 4

Electrical Properties of MLCC made from the aforementioned ceramic dielectric material

| No. | Dielectric constant | Dielectric loss DF ($\times 10^{-4}$) | Temperature coefficient $-55-+125°$ C. (ppm/° C.) | Insulation resistance ($\Omega$) |
|---|---|---|---|---|
| 11 | 11.6 | 1.3 | −3 - 20 | >$10^{11}$ |
| 12 | 11.2 | 0.8 | 14 - 27 | >$10^{11}$ |
| 13 | 10.3 | 1.5 | 2 - 13 | >$10^{11}$ |
| 14 | 9.7 | 1.0 | −8 - 16 | >$10^{11}$ |
| 15 | 9.3 | 0.6 | 10 - 23 | >$10^{11}$ |
| 16 | 10.6 | 0.8 | 4 - 26 | >$10^{11}$ |
| 17 | 9.2 | 0.9 | −10 - 22 | >$10^{11}$ |
| 18 | 8.9 | 1.1 | 3 - 17 | >$10^{11}$ |
| 19 | 9.5 | 0.7 | −5 - 17 | >$10^{11}$ |
| 20 | 10.1 | 1.0 | 6 - 15 | >$10^{11}$ |

The Third Embodiment

An anti-reductive high-frequency ceramic dielectric material sintered at low temperature and matched with copper internal electrode is fabricated as below: ball-milling and evenly mixing raw materials (>99.5% purity), 0.95 mol $Mg(OH)_2$, 0.95 mol $SiO_2$, 0.05 mol $BaCO_3$ and 0.05 mol $ZrO_2$, and calcining the mixture at 1150° C. for 3 hours to obtain a ceramic dielectric material containing main crystalline phase, $Mg_{0.9}Ba_{0.1}Si_{0.9}Zr_{0.1}O_3$; then adding modifying additive and sintering flux according to the preset ratios given in Table 5.

TABLE 5

Formula Compositions of main crystalline phase, modifying additive and sintering flux

| No. | Main crystalline phase $Mg_{0.8}Ba_{0.2}Si_{0.8}Zr_{0.2}O_3$ (mol %) | Modifying additive (mol %) | | | | | Sintering flux (mol %) | | | | | |
|---|---|---|---|---|---|---|---|---|---|---|---|---|
| | | $Li_2O$ | $TiO_2$ | MnO | CaO | $Bi_2O_3$ | $B_2O_3$ | ZnO | $SiO_2$ | CuO | $K_2O$ | BaO |
| 21 | 80 | 3.0 | 1.0 | 0.5 | 0 | 5.0 | 2.0 | 6.0 | 1.0 | 0 | 0.5 | 1.0 |
| 22 | 82 | 2.5 | 0.8 | 0.4 | 1.0 | 4.0 | 3.0 | 5.0 | 1.3 | 0 | 0 | 0.0 |
| 23 | 84 | 2.2 | 0.6 | 0.4 | 0.8 | 2.0 | 2.1 | 4.5 | 2.4 | 0 | 1.0 | 0 |
| 24 | 86 | 2.0 | 0.4 | 0.3 | 0.6 | 1.0 | 2.2 | 4.5 | 0 | 1.0 | 1.0 | 1.0 |
| 25 | 88 | 2.0 | 0.2 | 0.3 | 0.4 | 0 | 1.8 | 4.0 | 2.5 | 0 | 0 | 0.8 |
| 26 | 90 | 2.0 | 0 | 0.2 | 0.2 | 0 | 1.6 | 3.3 | 2.5 | 0 | 0 | 0.4 |
| 27 | 92 | 2.0 | 0 | 0.2 | 0 | 0 | 2.0 | 3.0 | 0 | 0.8 | 0 | 0 |
| 28 | 92 | 2.0 | 0 | 0.2 | 0 | 0 | 2.0 | 3.8 | 0 | 1.0 | 0 | 0 |
| 29 | 94 | 1.5 | 0 | 0.2 | 0 | 0 | 1.5 | 2.5 | 0.3 | 0 | 0 | 0 |
| 30 | 95 | 1.0 | 0 | 0.2 | 0 | 0 | 1.0 | 1.5 | 0 | 0 | 0 | 1.3 |

Table 6 shows the results of the electrical property tests of MLCC manufactured with the method of the first embodiment.

TABLE 6

Electrical Properties of MLCC from the aforementioned ceramic dielectric material

| No. | Dielectric constant | Dielectric loss DF ($\times 10^{-4}$) | Temperature coefficient −55−+125° C. (ppm/° C.) | Insulation resistance (Ω) |
| --- | --- | --- | --- | --- |
| 21 | 8.9 | 0.7 | −12 - 22 | $>10^{11}$ |
| 22 | 9.1 | 0.8 | 4 - 16 | $>10^{11}$ |
| 23 | 9.2 | 0.6 | 11 - 23 | $>10^{11}$ |
| 24 | 9.5 | 1.0 | −8 - 19 | $>10^{11}$ |
| 25 | 9.7 | 1.2 | 10 - 23 | $>10^{11}$ |
| 26 | 10.0 | 1.1 | 5 - 16 | $>10^{11}$ |
| 27 | 10.4 | 0.8 | −5 - 20 | $>10^{11}$ |
| 28 | 10.7 | 1.3 | 3 - 19 | $>10^{11}$ |
| 29 | 11.2 | 1.2 | −5 - 17 | $>10^{11}$ |
| 30 | 11.5 | 1.0 | −6 - 15 | $>10^{11}$ |

What is claimed is:

1. An anti-reductive high-frequency ceramic dielectric material comprising main crystalline phase, modifying additive and sintering flux, wherein the formula of said main crystalline phase is $Mg_xBa_{(1-x)}Zr_ySi_{(1-y)}O_3$ with $0.8 \leq x \leq 0.95$ and $0.05 \leq y \leq 0.2$, said modifying additive is one or more of $MnO_2$, $CaO$, $Li_2O$, $Bi_2O_3$ and $TiO_2$, and said sintering flux is one or more of $B_2O_3$, $SiO_2$, $ZnO$, $CuO$, $K_2O$ and $BaO$.

2. The anti-reductive high-frequency ceramic dielectric material of claim 1, wherein said main crystalline phase is in a range of 80-95 mol %, said modifying additive is in a range of 1.2[N]=10 mol % and said sintering flux is in a range of 2.5-18 mol %.

3. The anti-reductive high-frequency ceramic dielectric material of claim 2, wherein said main crystalline phase is $Mg_xBa_{(1-x)}Zr_ySi_{(1-y)}O_3$ with $0.8 \leq x \leq 0.95$ and $0.05 \leq y \leq 0.2$, which is obtained by ball-milling and evenly mixing $Mg(OH)_2$, $BaCO_3$, $ZrO_2$ and $SiO_2$, and then precalcining its mixture thereof at 1050° C.-1170° C.

4. The anti-reductive high-frequency ceramic dielectric material of claim 2, wherein components of said modifying additive in the anti-reductive high-frequency ceramic dielectric material sintered at low temperature and matched with copper internal electrode comprise $MnO_2$ 0.2-0.5 mol %, $CaO$ 0-1.0 mol %, $Li_2O$ 1.0-3.0 mol %, $Bi_2O_3$ 0-5.0 mol % and $TiO_2$ 0-1.0 mol %.

5. The anti-reductive high-frequency ceramic dielectric material of claim 2, wherein components of said sintering flux in the anti-reductive high-frequency ceramic dielectric material sintered at low temperature and matched with copper internal electrode comprise $B_2O_3$ 1.0-3.0 mol %, $SiO_2$ 0-6.0 mol %, $ZnO$ 1.5-6.0 mol %, $CuO$ 0-1.0 mol %, $K_2O$ 0-1.0 mol % and $BaO$ 0-1.0 mol %.

6. The anti-reductive high-frequency ceramic dielectric material of claim 1, wherein said ceramic dielectric material is sintered under reducing atmosphere between 1000° C.-1100° C. to form a ceramic capacitor, wherein the ceramic capacitor has copper internal electrodes and electrical properties that meet the requirements of the high-frequency chip on glass (COG) characteristics.

7. The anti-reductive high-frequency ceramic dielectric material of claim 2, wherein said ceramic dielectric material is sintered under reducing atmosphere between 1000° C.-1100° C. to form a ceramic capacitor, wherein the ceramic capacitor has copper internal electrodes and electrical properties that meet the requirements of the high-frequency chip COG characteristics.

8. The anti-reductive high-frequency ceramic dielectric material of claim 3, wherein said ceramic dielectric material is sintered under reducing atmosphere between 1000° C.-1100° C. to form a ceramic capacitor, wherein the ceramic capacitor has copper internal electrodes and electrical properties that meet the requirements of the high-frequency chip COG characteristics.

9. The anti-reductive high-frequency ceramic dielectric material of claim 4, wherein said ceramic dielectric material is sintered under reducing atmosphere between 1000° C.-1100° C. to form a ceramic capacitor, wherein the ceramic capacitor has copper internal electrodes and electrical properties that meet the requirements of the high-frequency chip COG characteristics.

10. The anti-reductive high-frequency ceramic dielectric material of claim 5, wherein said ceramic dielectric material is sintered under reducing atmosphere between 1000° C.-1100° C. to form a ceramic capacitor, wherein the ceramic capacitor has copper internal electrodes and electrical properties that meet the requirements of the high-frequency chip COG characteristics.

* * * * *